US009537580B2

(12) United States Patent
Featherston et al.

(10) Patent No.: US 9,537,580 B2
(45) Date of Patent: Jan. 3, 2017

(54) OPTICAL RECEIVER SENSITIVITY SYSTEM (71) Applicants: John Featherston, Fort Wayne, IN (US); James M. Cicchiello, Fort Wayne, IN (US); Curtis J. Harkrider, Wheaton, IL (US); Christopher A. Archer, Fort Wayne, IN (US); Frederick D. Bean, Fort Wayne, IN (US)

(72) Inventors: John Featherston, Fort Wayne, IN (US); James M. Cicchiello, Fort Wayne, IN (US); Curtis J. Harkrider, Wheaton, IL (US); Christopher A. Archer, Fort Wayne, IN (US); Frederick D. Bean, Fort Wayne, IN (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 256 days.

(21) Appl. No.: 14/132,775

(22) Filed: Dec. 18, 2013

(65) Prior Publication Data
US 2015/0171957 A1  Jun. 18, 2015

(51) Int. Cl.
H04B 10/00 (2013.01)
G02F 1/00 (2006.01)
H01S 3/00 (2006.01)
H04B 10/06 (2006.01)
H04B 10/08 (2006.01)
H04B 10/67 (2013.01)

(52) U.S. Cl.
CPC ............. H04B 10/674 (2013.01); H04B 10/12 (2013.01)

(58) Field of Classification Search
CPC ......... H04B 10/07; H04B 10/11; H04B 10/60; H04B 10/674; H04B 10/12; H04B 10/08; H04B 10/077; H04B 10/07953; H04B 10/07955; H04B 10/07957
USPC .......... 398/38, 5, 202, 131, 33; 359/172, 154
See application file for complete search history.

(56) References Cited

U.S. PATENT DOCUMENTS

| 3,131,258 A | * | 4/1964 | O'Neill, Jr. ............. H03D 1/18 327/46 |
| 3,441,682 A | * | 4/1969 | Pasternack ............. H04Q 1/453 327/46 |
| 4,072,281 A | * | 2/1978 | Miller, Jr. ................ F41G 7/26 244/3.16 |
| 5,363,221 A | * | 11/1994 | Sutton ..................... H04J 14/02 359/11 |
| 6,122,084 A | * | 9/2000 | Britz .................. H04B 10/0775 385/140 |
| 6,348,684 B1 | | 2/2002 | Nykolak et al. |
| 6,643,466 B1 | | 11/2003 | Helms et al. |
| 7,110,678 B2 | | 9/2006 | Willebrand et al. |

(Continued)

Primary Examiner — Ken N Vanderpuye
Assistant Examiner — Abbas H Alagheband
(74) Attorney, Agent, or Firm — Tarolli, Sundheim, Covell & Tummino LLP (57) ABSTRACT A system includes a detector array having a plurality of level detectors to monitor an optical input signal. Each level detector of the detector array operates in a different operating range, and each operating range for each level detector has a different saturation level and a different cutoff level based on a power level of the optical input signal. A controller monitors the plurality of level detectors of the detector array to detect a present power level for the optical input signal by selecting the operating range that is associated with the level detector operating between its saturation level and its cutoff level.

16 Claims, 5 Drawing Sheets (56) References Cited

U.S. PATENT DOCUMENTS

| | | | |
|---|---|---|---|
| 7,283,751 B2 | 10/2007 | Bruesselbach et al. | |
| 7,286,766 B2 | 10/2007 | Shelton et al. | |
| 7,346,281 B2 | 3/2008 | Wilcken et al. | |
| 7,593,641 B2 | 9/2009 | Tegge, Jr. | |
| 8,767,288 B2 * | 7/2014 | Bai | H04B 10/2931 359/341.33 |
| 2003/0007206 A1 * | 1/2003 | Sussman | H04B 10/077 398/5 |
| 2003/0030862 A1 * | 2/2003 | Trier | H04B 10/07953 398/5 |
| 2003/0067657 A1 | 4/2003 | Dimmler et al. | |
| 2004/0052465 A1 | 3/2004 | Verbana et al. | |
| 2005/0078957 A1 * | 4/2005 | Hendow | G01J 3/36 398/33 |
| 2007/0127008 A1 * | 6/2007 | Ash | F41G 3/02 356/4.01 |
| 2009/0041476 A1 * | 2/2009 | Ann | H04B 10/1121 398/202 |
| 2011/0127415 A1 * | 6/2011 | Kanter | G01J 1/44 250/252.1 |
| 2012/0321299 A1 * | 12/2012 | Oguma | H04B 10/07955 398/34 |
| 2013/0004181 A1 | 1/2013 | Juarez et al. | |
| 2014/0233960 A1 * | 8/2014 | Peach | H04L 12/00 398/119 |
| 2016/0043800 A1 * | 2/2016 | Kingsbury | H04B 10/118 398/125 |

\* cited by examiner

OPTICAL RECEIVER SENSITIVITY SYSTEM

TECHNICAL FIELD

This disclosure relates to optical communications, and more particularly to an optical receiver system that utilizes a level detector array to extend the dynamic range and communications performance of the system.

BACKGROUND

Free space optical communication has attracted considerable attention recently for a variety of applications. Atmospheric turbulence can degrade the performance of free-space optical links (e.g., tens of decibels), particularly over ranges of the order of 1 km or longer. Lack of homogeneity in the temperature and pressure of the atmosphere, for example, can lead to variations of the refractive index along the optical transmission path. Such refractive index variations can deteriorate the quality of the received signal and can cause fluctuations in both the intensity and the phase of the received optical transmission. These fluctuations, which are also referred to as fading, can lead to an increase in the link error probability, limiting the performance of optical communication systems.

For optical communications systems design, the effects of fading should be accounted for to ensure reliable system operation. In suitable atmospheric conditions, received optical signals may be strong which could saturate a photodetector at the optical receiver. In poor atmospheric conditions, weak optical signals need to be boosted over background noise levels in order to properly distinguish transmitted data from noise. Thus, optical systems needs to be designed to operate over a fairly large dynamic power range accounting for strong signal strength under optimal conditions and weak signal strength under poor conditions. Also, movement between either the optical transmitter and/or receiver can similarly cause optical signal fluctuation.

SUMMARY

This disclosure relates to optical communications systems. In one aspect, a system includes a detector array having a plurality of level detectors to monitor an optical input signal. Each level detector of the detector array operates in a different operating range, and each operating range for each level detector has a different saturation level and a different cutoff level based on a power level of the optical input signal. A controller monitors the plurality of level detectors of the detector array to detect a present power level for the optical input signal by selecting the operating range that is associated with the level detector operating between its saturation level and its cutoff level.

In another aspect, includes a monitor array having a plurality of level detectors to monitor an optical input signal. Each level detector of the monitor array employs a different integration time to sense differing power levels in the optical input signal. A controller monitors the plurality of level detectors of the monitor array to detect a present power level for the optical input signal and controls an output signal attenuation level to a receiver photodector based on the detected present power level of the optical input signal. At least one variable optical attenuator (VOA) adjusts the output signal attenuation level to the receiver photodector in response to the controller.

In yet another aspect, a converter array includes at least two level detectors to receive an optical input signal and to generate at least one output signal from each level detector. Each level detector of the converter array operates in a different operating range and each operating range for each level detector has a different saturation level and a different cutoff level based on a power level of the optical input signal. An analog to digital converter (A/D) array converts the output signal from each level detector of the converter array to a digital packet associated with each level detector. A controller processes the digital packet associated with each level detector from the A/D array and selects the operating range for each level detector based on the digital packet associated with each level detector. The controller decodes data from the digital packet associated with the level detector operating between the saturation level and the cutoff level.

DETAILED DESCRIPTION

This disclosure relates to an optical receiver system that utilizes a level detector array to extend the dynamic range and communications performance of the system. Deep atmospheric fading is a fundamental issue on Free Space Optical (FSO) links causing loss of communication for extended periods of time. Such fading can cause intermittent substantial reductions of optical power at a receiver which can last for several microseconds. At high data rates (e.g., 10 Gbps) each instance of a "deep fade" in a standard receiver can cause loss of up to 100,000 bits, loss of clock, and loss of frame. As a consequence, data has to be retransmitted and Quality of Service (QoS) can decrease to intolerable levels. The optical receiver system disclosed herein utilizes a level detector array having a plurality of detectors in the array that are configured with varying sensitivity levels. Optical taps in the system divide a received optical signal into smaller optical signals of varying power levels that can be analyzed to determine the present incoming power level of the received optical signal in real time which mitigates loss of data in the receiver due to delay.

Based on saturation and cutoff properties of optical detectors in the array, the incoming signal power level can be determined by selecting the operating range of the level detector in the array that operates between the saturation and cutoff level. For example, if one level detector in the array is saturated and another level detector in the array is in cutoff (e.g., signal level below a predetermined signal-to-noise ratio), then the level detector in the array that operates between the two levels can be selected as an indication of the present power level of the received optical signal. Such determinations can be made by a controller that compares the output of each level detector to predetermined thresholds to determine the operating range of a given level detector and thus determine the present power level of the received optical signal.

In one example, the controller monitors the level detector array and adjusts the attenuation level of the optical receiver system based on the determined signal level from the level detector array. The optical detectors monitored by the controller in the level detector array can be configured with varying integration times to further enhance the sensitivity detection capabilities of the array. In another example, the level detector array can be employed as a converter array. Output from each level detector in the converter array can be converted to a digital packet where each digital packet is analyzed to determine which path through the level detector array provides the desired communications capability. For example, the level detector in the level detector array that provides a desired bit error rate (BER) in the received digital packet as compared to a predetermined threshold can be selected as the present communications channel (based on current fading conditions) for further communications.

By utilizing an array of level detectors set at varying power and/or sensitivity levels, incoming optical signals can be analyzed in real time which allows for dynamic adjustment to fading conditions while mitigating losses due to delay. Moreover, the dynamic range of the optical receiver system can be increased (e.g., greater than 60 DB) since the level detector array can be configured to analyze weak signals (e.g., due to fading) with high sensitivity detectors in the array and stronger signals with varying degrees of lower sensitivity detectors in the array. By detecting signals across a substantial range of strong and weak signals in the level detector array, and analyzing and/or adjusting receiver power sensitivity with the controller, high fidelity optical communications capability can be provided that operate over a large dynamic range of received optical power levels. Thus, broad dynamic range can be achieved by mitigating saturation when signal strength is strong or bursting.

Figure 1:
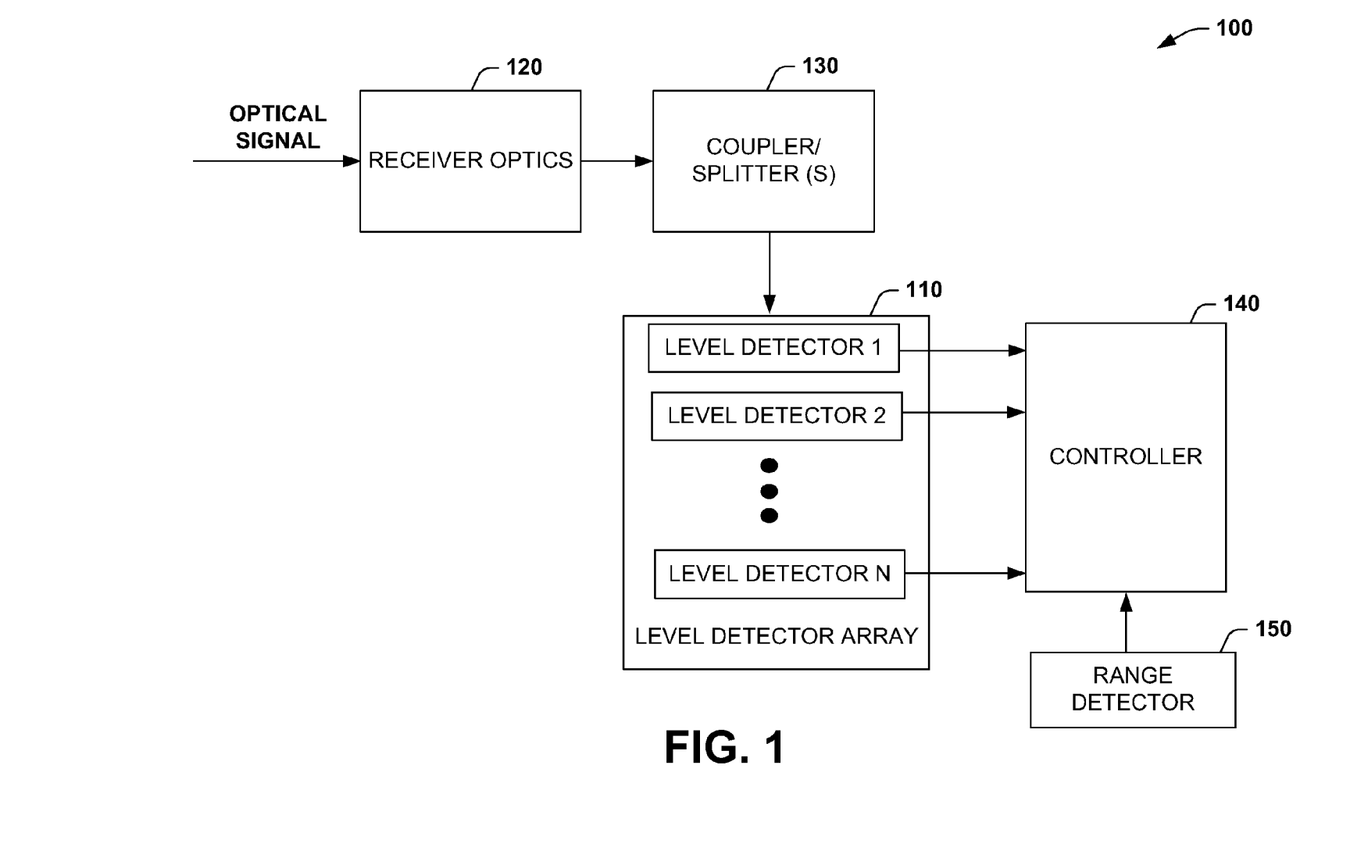
FIG. 1 illustrates an example of an optical receiver system that utilizes a level detector array having varying optical detector sensitivity levels across the array to improve the dynamic range and communications performance of an optical receiver.

FIG. 1 illustrates an example of an optical receiver system 100 that utilizes a level detector array 110 having varying optical detector sensitivity levels across the array to improve the dynamic range and communications performance of an optical receiver. The system 100 includes receiver optics 120 that can include telescopic components and filters for receiving an optical signal. Output from the receiver optics 120 is fed to one or more optical couplers and/or splitters 130 that optically divide the optical signal into vary degrees of power level. As used herein, a coupler is typically a fiber (e.g., multimode fiber single mode fiber) for guiding light whereas a splitter typically utilizes a prism, lens and/or mirrors to guide the light. Optical taps in the coupler/splitter 130 divide the received optical signal into smaller optical signals of varying power levels that can be analyzed to determine the present incoming power level of the received optical signal in real time which mitigates loss of data in the receiver due to delay.

The detector array 110 receives optical signal from the taps in the coupler/splitter 130 where at least two level detectors (shown as level detectors 1 though N, with N being a positive integer) in the array monitor the optical input signal at various tap points such that each level detector receives a differing amount of input power from the optical signal. Each level detector of the detector array 110 operates in a different operating range depending on the amount of signal received from the respective tap from the coupler/splitter 130. Each operating range for each level detector has a different saturation level and a different cutoff level based on the power level of the optical input signal received from the respective tap point. As used herein, saturation level refers to when a photodiode detector (or photo transistor) has been saturated due to excessive received signal strength. Cutoff refers to signal level received at the optical detector that is below a predetermined signal-to-noise ratio. A controller 140 monitors the level detectors of the detector array 110 to detect a present power level for the optical input signal by selecting the level detector operating between the saturation level and the cutoff level. A range detector (e.g., GPS system) 150 can supply range information indicating distance between a transmitter (not shown) that generates the optical signal and the receiver system 100. Such range information can be used by the controller 140 to calibrate system intensity levels based on the distance between transmitter and receiver. Such range detection can be employed since the range between transmitter node and receiver node may not be known a priori and one, or both of the nodes may be moving. The distance data supplied by the range detector 150 can be provided by a direct measurement via a RADAR system, for example, provided by a round-trip transit time measurement via an ancillary communication system or a laser system, for example, or provided by a data input received from a communications channel or a global positioning system (GPS), for example.

Based on saturation and cutoff properties of optical detectors in the level detector array 110, the incoming signal power level can be determined by selecting the level detector in the array that operates between the saturation and cutoff level. For example, if one level detector in the array is saturated and another level detector in the array is in cutoff, then the level detector in the array that operates between the two levels (e.g., above a minimum power threshold defined by cutoff and a maximum power threshold defined by saturation) can be selected as an indication of the present power level of the received optical signal. Such determinations can be made by the controller 140 that compares the output of each level detector to predetermined thresholds to determine the operating range of a given level detector and thus determine the present power level of the received optical signal.

By utilizing the array 110 of level detectors set at varying power and/or sensitivity levels, incoming optical signals can be analyzed in real time which allows for dynamic adjustment by the controller 140 to fading conditions while mitigating losses due to delay. The dynamic range of the optical receiver system 100 can be increased (e.g., greater than 60 DB) since the level detector array 110 can be configured to analyze weak signals (e.g., due to fading) with high sensitivity level detectors in the array and stronger signals with varying degrees of lower sensitivity detectors in the array. By detecting signals across a substantial range of strong and weak signals in the level detector array (e.g., due to fading and distance variation), and analyzing and/or adjusting receiver power sensitivity with the controller 140, high fidelity optical communications capability can be provided that operate over a large dynamic range of received optical power levels.

The system 100 can be employed in differing configurations to provide large dynamic range and high fidelity optical communications. In one example configuration (e.g., See FIGS. 2 and 4), the level detector array 110 can be configured as a monitor array having a plurality of level detectors to monitor the optical input signal. Each level detector of the monitor array can employ a different integration time, for example to sense differing power levels in the optical input signal. In the monitor array configuration, the controller monitors the level detectors of the monitor array to detect a present power level for the optical input signal and controls an output signal attenuation level to a photodector based on the detected present power level of the optical input signal. At least one variable optical attenuator (VOA) is provided along with the monitor array configuration to adjust the output signal attenuation level to the photodector in response to the controller 140.

In another example configuration of the system 100 (See FIGS. 3 and 5) the system 100 can include a converter array having a plurality of level detectors to receive the optical input signal and to generate at least one output signal from each level detector. Each level detector of the converter array operates in a different operating range, where each operating range for each level detector can have a different saturation level and a different cutoff level based on a power level of the optical input signal. An analog to digital converter (A/D) array (e.g., inside or outside the controller) converts the output signal from each level detector of the converter array to a digital packet associated with each level detector. The controller 140 processes the digital packet associated with each level detector from the A/D array and determines the operating range for each level detector based on the digital packet associated with each level detector. The controller 140 decodes communications data from the digital packet associated with the level detector operating between the saturation level and the cutoff level. For example, the level detector in the level detector array 110 that provides a desired bit error rate (BER) (or other measuring parameter) in the received digital packet as compared to a predetermined threshold (e.g., BER below threshold) can be selected as the present communications channel (based on current fading conditions) for further communications. The monitor array and converter array configurations are further described with respect to FIG. 2 through 5 which are described below.

Figure 2:
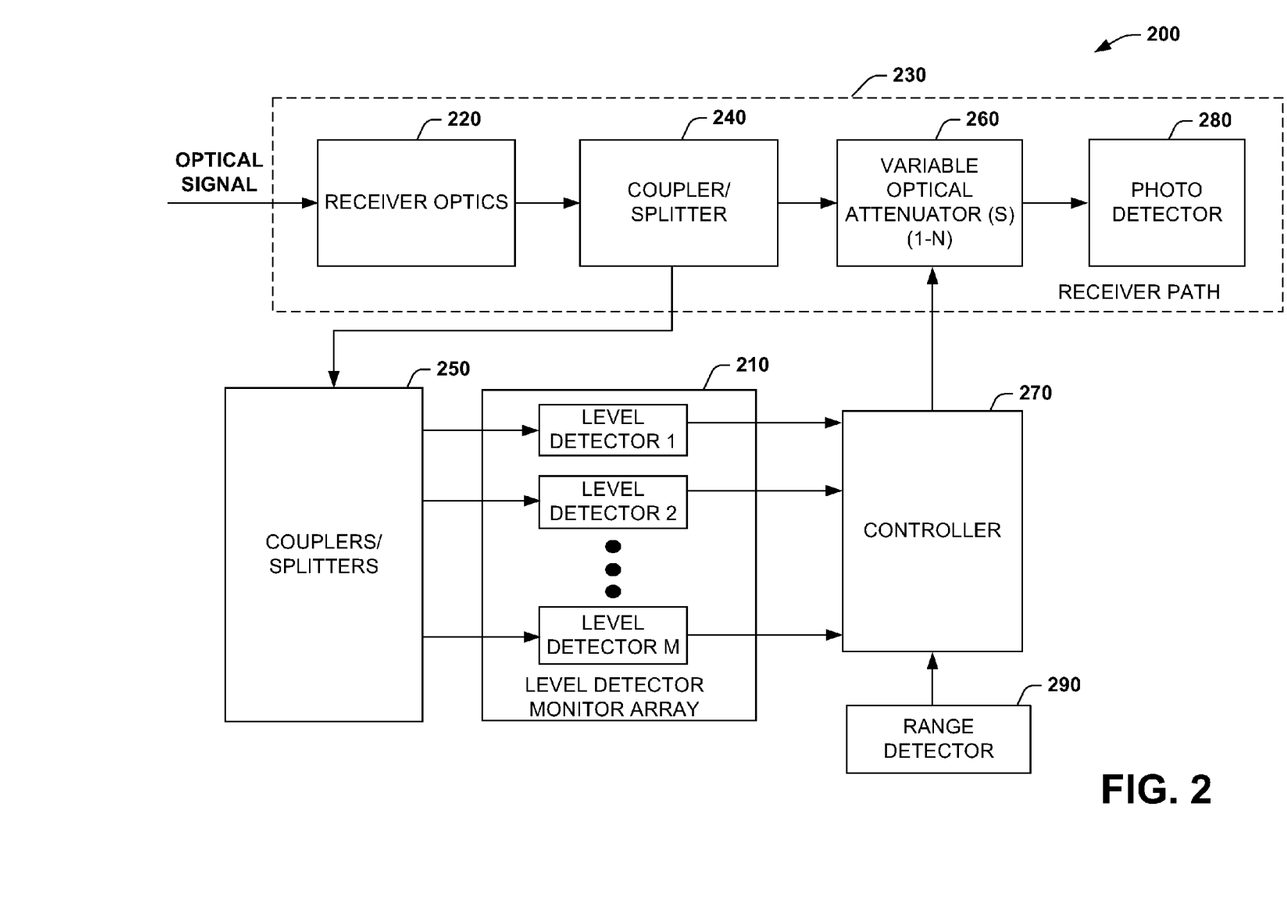
FIG. 2 illustrates an example of an optical receiver system that utilizes a level detector array to monitor an optical signal over varying sensitivity levels and dynamically adjust the sensitivity level of an optical receiver based on controlled attenuation of the optical signal.

FIG. 2 illustrates an example of an optical receiver system 200 that utilizes a level detector array 210 to monitor an optical signal over varying sensitivity levels and dynamically adjust the sensitivity level of an optical receiver based on controlled attenuation of the optical signal. An optical signal received from an optical transmitter (e.g., laser transmitter not shown) is received through receiver optics 220 and proceeds along a receiver path 230. Output from the receiver optics 220 is split via a coupler/splitter 240 (e.g., 1×2 split, 99/1 multimode fiber coupler) where the majority of signal is sent along the receiver path 230 and some of the optical signal is diverted to a plurality of other coupler/splitters 250 which divide the optical signal for each level detector (shown as level detectors 1 through M, with M being a positive integer) in the level detector array 210. Thus, at various tap points from the couplers/splitters 250, each level detector in the level detector array 210 receives a different proportion of optical signal power from the optical signal. In this example, the level detector array 210 is referred to as a level detector monitor array since the array is employed to detect in real time the received signal strength of the optical signal.

Referring back to the receiver path 230, output from the coupler/splitter is fed to one or more variable optical attenuators (VOA) 260 which are controlled by a controller 270 to adjust the attenuation level for the received optical signal. Output from the VOA 260 is fed to a receiver photodector 280 (e.g., photodiode or phototransistor) from which communications data can be received therefrom. Output from the receiver photodector 280 can be converted to an electrical signal where communications data in the optical signal can be subsequently processed as received communications data. The controller 210 analyzes the level detectors in the level detector monitor array 210 to determine the respective power level of the optical input signal. As noted above, the incoming signal power level can be determined by selecting the operating range of the level detector in the array 210 that operates between the saturation and cutoff level. For example, if one level detector in the array is saturated and another level detector in the array is in cutoff, then the level detector in the array that operates between the two levels (e.g., above a minimum power threshold defined by cutoff and a maximum power threshold defined by saturation) can be selected as an indication of the present power level of the received optical signal.

Such determinations can be made by the controller 270 that compares the output of each level detector to predetermined thresholds to determine the operating range of a given level detector and thus determine the present power level of the received optical signal. If only two detectors are employed in the level detector array 210, the controller can use a single threshold for strong signals by selecting the level detector that is below the saturation level. Conversely, for weak signals in a two level detector array example, the controller 270 could select the level detector that had the highest signal about a cutoff threshold. Otherwise, for arrays having more than two detectors, the controller 270 can select the level detector having the highest signal value that is between the saturation and cutoff levels.

After determining the approximate power level from the level detector monitor array 210, the controller 270 provides an output signal to the VOA 260 to adjust the attenuation level of the received optical signal along the receiver path 230. Such adjustment can be via voltage control and/or mechanical control (e.g., adjusting a beam angle). The VOA 260 can be a variable neutral density filter, for example. By determining the approximate power level of the optical signal via the level detector monitor array 210, the controller 270 can dynamically adjust the VOA 260 to provide adjustments due to atmospheric conditions and/or distance change between receiver and transmitter in real time. Thus, feedforward control is provided over the receiver path 210 that mitigates loss of data. As will be described below with respect to FIG. 4, a delay line can be placed in the receiver path 210 to facilitate operations of the feed-forward control. By leveraging the delay line, and monitoring optical signal prior to the fade, the signal level can be adjusted at the start of the fade providing feed-forward, or "forward-looking" control. Under strong signal conditions (e.g., clear line of site conditions with minimal fading), the controller 270 can cause the VOA 260 to increase its attenuation level to mitigate saturation of the receiver photodector 280. Under weaker signal conditions (e.g., due to fading and/or distance changes), the controller 270 can cause the VOA 280 to reduce its attenuation level and mitigate the receiver photodector 280 from cutoff.

As shown, a range detector 290 can provide range data indicating the distance between transmitter and receiver. The range data can be used to calibrate the VOA 260 via the controller 270 (stronger or weaker attenuation) based on the indicated distance. The range detector 290 can be substantially any type including RADAR, alternate communications systems, global positioning systems (GPS), and laser range detectors, for example. The controller 270 can be a microprocessor, micro-controller having on-board analog-to-digital (A/D) converters, or can be a system such as a programmable controller system (PLC), for example. As will be described below with respect to FIG. 4, the level detector monitor array 210 can include photodectors that are selected with varying integration times to further improve the sensitivity and detection capabilities of the array.

Figure 3:
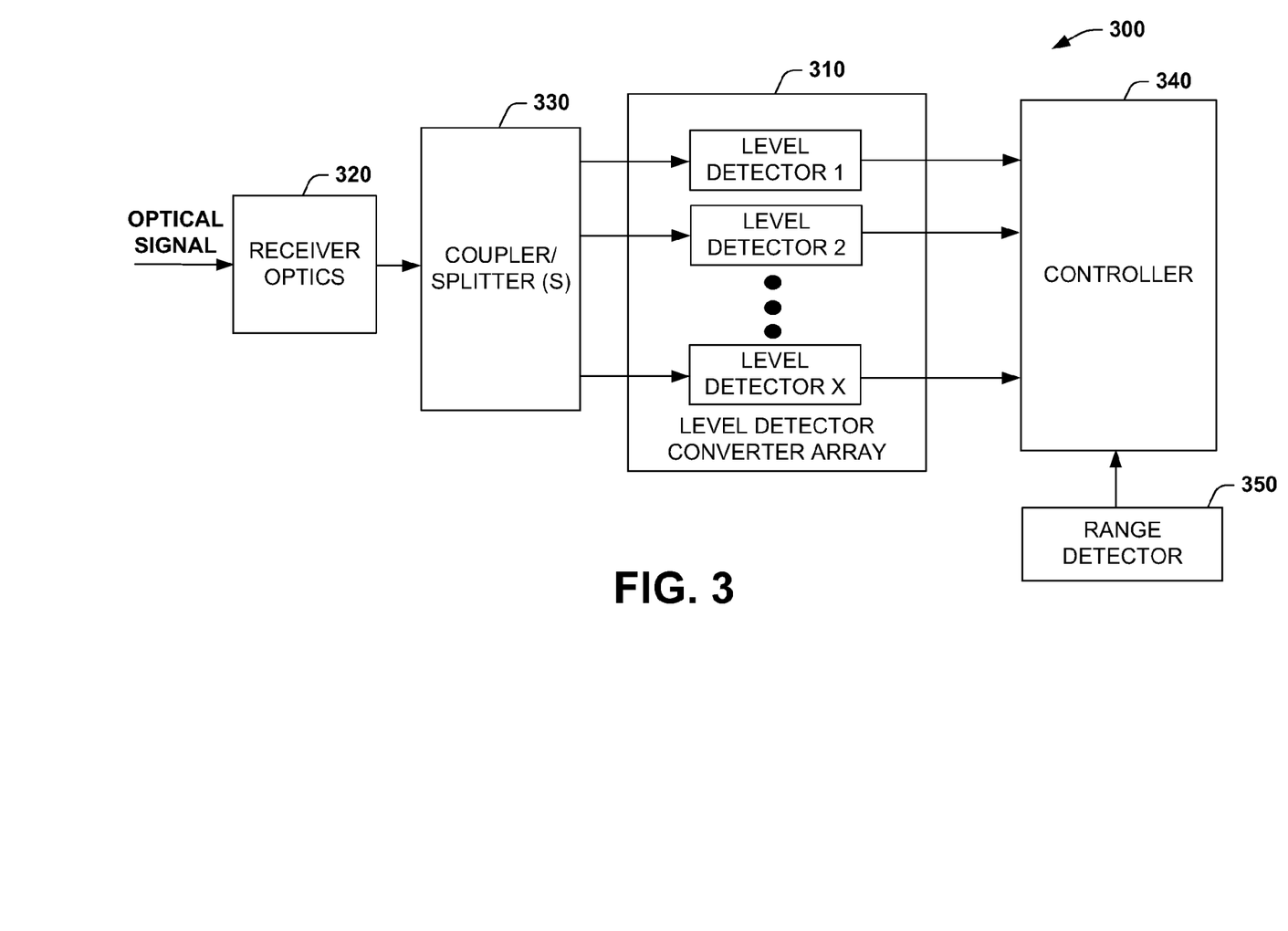
FIG. 3 illustrates an example of an optical receiver system that decodes data packets from a level detector array having varying sensitivity levels across the array.

FIG. 3 illustrates an example of an optical receiver system 300 that decodes data packets from a level detector array 310 having varying sensitivity levels across the array, wherein the array includes two or more level detectors shown as detectors 1 though X, with X being a positive integer. In this example, the level detector array 310 can also be referred to as a level detector converter array. In contrast to the system described above with respect to FIG. 2 that utilized the array for monitoring received signal strength, the level detector converter array 310 employs the array to convert received optical signals to alternate communications paths or channels where data can be derived directly. An optical signal is received through receiver optics 320 and processed through one or more coupler/splitters 330 at the output of the receiver optics. Output from the coupler/splitters 330 passes through the level detector converter array 310 and processed by a controller 340.

The controller 340 analyzes each signal received from each level detector in the level detector converter array 310 to determine a suitable communications path. For example, the controller 340 can include internal analog-to-digital converters (or converter array) that converts each signal from the level detector converter array 310 into a digital packet—a separate packet for each level detector in the array. Based on the detected quality of the received signal and for each level detector, the controller selects a communications path through the array 310 that provides suitable communications. For example, if one level detector is in saturation, the received signal bit error rate (BER) would be above a predetermined threshold and the controller 340 would reject that path or channel. Similarly, if another level detector in the array 310 were below a cutoff threshold, then the BER would also be above the predetermined threshold and the controller 340 would similarly reject that path or channel while then selecting a more suitable path.

If communications are received though a path of the array 310 that provides a suitable communications channel, then the level detector in the array will be selected for ongoing communications as long as conditions are favorable for such communications. If conditions change due to fading and/or high signal strength conditions, then an alternative channel can be selected by the controller 340 as conditions change. As shown, a range detector 350 can also be employed. Data from the range detector 350 can be used to calibrate converters in the controller (e.g., calibrate bias and operating range of A/D converters based on range). As will be described below with respect to FIG. 5, A/D converters can be configured as an external array to the controller 340 in another example. After data has been converted by the controller 340 to a digital packet over the selected communications channel from the level detector converter array 310, communications data at the receiver can be decoded and/or further processed.

Figure 4:
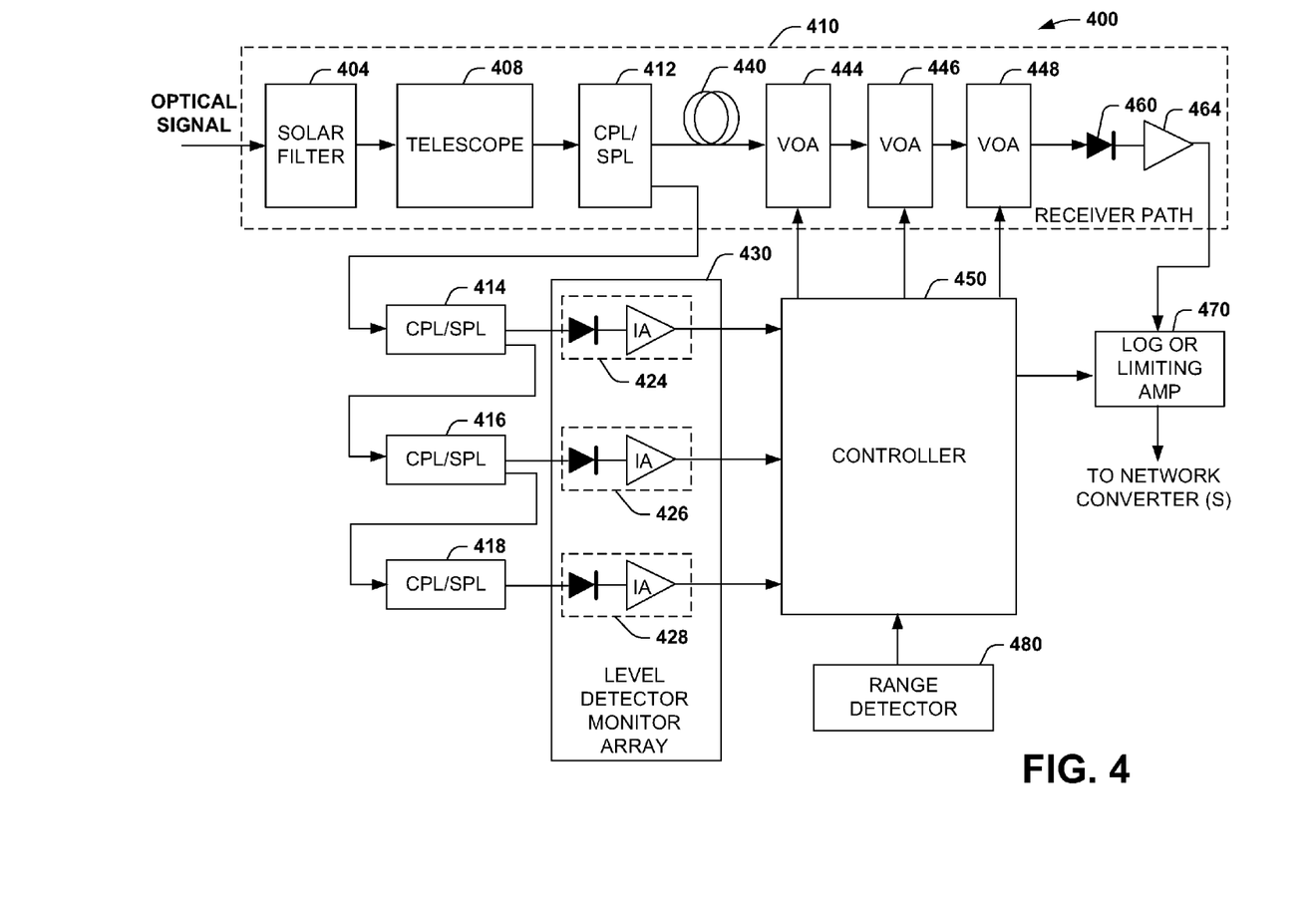
FIG. 4 illustrates an example of the optical receiver system illustrated in FIG. 2.

FIG. 4 illustrates an example system 400 that is an example of the optical receiver system illustrated in FIG. 2. An optical signal received from an optical transmitter (e.g., laser transmitter not shown) is received through receiver optics that includes a solar filter 404 and telescope 408. Optical signal from the telescope 408 proceeds along a receiver path 410 and is split via a coupler/splitter 412 (e.g., 1×2 split, 99/1 multimode fiber coupler) where the majority of signal is sent along the receiver path 410 and some of the optical signal is diverted to three other coupler/splitters 414, 416, and 418 which divide the optical signal for each level detector 424, 426, and 428 in a level detector array 430. At various tap points from the couplers/splitters 414 through 418, each level detector 424 through 428 in the level detector array 430 receives a different proportion of optical signal power from the optical signal. In this example, the level detector array 430 is referred to as a level detector monitor array since the array is employed to detect in real time the received signal strength of the optical signal.

In this example, each level detector 424 through 428 includes a photodector (e.g., photodiode or phototransistor) to convert optical signals to electrical signals. Output from each photodector is sent to an integrating amplifier (IA). Each photodector can be selected for a differing integration time to improve sensitivity of the array. For example, the photodector of level detector 424 can have a 10 millisecond integration time, the photodector of level detector 426 can have 100 microsecond integration time, and the photodector of level detector 428 can have 1 microsecond integration time. Thus, in this example configuration, the longest integration time can be employed for weaker signals and the longer integrations times for stronger signals. Similarly, the integration constant of the IA's in each level detector 424 though 428 can be altered to further increase sensitivity (e.g., feedback capacitor of integrator selected differently for each level detector).

Referring back to the receiver path 410, output from the coupler/splitter 412 is fed through a delay loop 440 (e.g., multimode fiber loop) to three variable optical attenuators (VOA) 444, 446, and 448 which are controlled by a controller 450 to adjust the attenuation level for the received optical signal. Output from the VOA's 444 through 448 is fed to a receiver photodector 460 from which communications data can be received therefrom. Output from the photodector 460 can be amplified via amplifier 464 (e.g., integrating amplifier). Output from amplifier 464 can be sent to a logarithmic or limiting amplifier 470 which can be selected by the controller 450 depending on receiver signal strength. Output from the amplifier 470 can be sent to one or more network adapters (e.g., not shown) for further network communications (e.g., 10 base T controller, Ethernet adapter, and so forth). The controller 450 analyzes the level detectors 424 though 428 in the level detector monitor array 430 to determine the respective power level of the optical input signal. As noted above, the incoming signal power level can be determined by selecting the level detector in the array 430 that operates between the saturation and cutoff level. For example, if one level detector in the array is saturated and another level detector in the array is in cutoff, then the level detector in the array that operates between the two levels (e.g., above a minimum power threshold defined by cutoff and a maximum power threshold defined by saturation) can be selected as an indication of the present power level of the received optical signal.

Such determinations can be made by the controller 450 that compares the output of each level detector 424-428 to predetermined thresholds to determine the operating range of a given level detector and thus determine the present power level of the received optical signal. If only two detectors are employed in the level detector array 430, the controller 450 can use a single threshold for strong signals by selecting the level detector that is below the saturation level. Conversely, for weak signals in a two level detector array example, the controller 450 could select the level detector that had the highest signal about a cutoff threshold. Otherwise, for arrays having more than two detectors such as shown in this example, the controller 450 can select the level detector having the highest signal value that is between the saturation and cutoff levels, for example.

After determining the approximate power level from the level detector monitor array 430, the controller 450 provides an output signal to the VOA's 444 through 448 to adjust the attenuation level of the received optical signal along the receiver path 410. Such adjustment can be via voltage control and/or mechanical control (e.g., adjusting a beam angle). The VOA's 44-448 can be a variable neutral density filter, for example. By determining the approximate power level of the optical signal via the level detector monitor array 430, the controller 450 can dynamically adjust the VOA's 444-448 to provide adjustments due to atmospheric conditions and/or distance change between receiver and transmitter. For example, under strong signal conditions (e.g., clear line of site conditions with minimal fading), the controller 450 can cause the VOA's 444-448 to increase its attenuation level to mitigate saturation of the receiver photodector 460. Under weaker signal conditions (e.g., due to fading or distance changes), the controller 450 can cause the VOA's 444-448 to reduce its attenuation level and mitigate the receiver photodector 460 from cutoff.

As shown, a range detector 480 can provide range data indicating the distance between transmitter and receiver. The range data can be used to calibrate the VOA's 444-448 via the controller 450 (stronger or weaker attenuation) based on the indicated distance. As noted above, the range detector 480 can be substantially any type including RADAR global positioning systems (GPS), and laser range detectors, for example. Also, the controller 450 can be a microprocessor, micro-controller having on-board analog-to-digital (A/D) converters, or can be a system such as a programmable controller system (PLC), for example.

Figure 5:
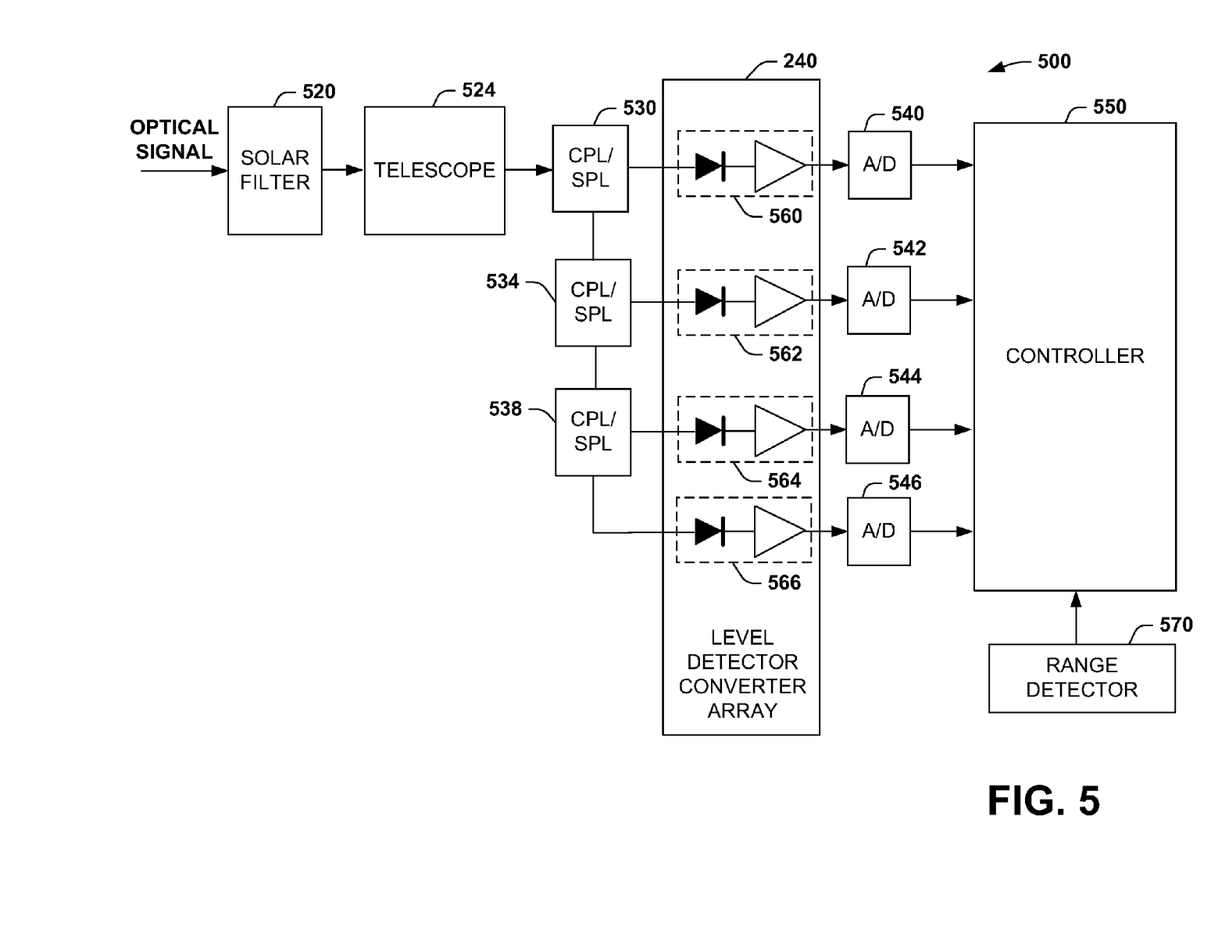
FIG. 5 illustrates an example of the optical receiver system illustrated in FIG. 3.

FIG. 5 illustrates an example system 500 that is an example of the optical receiver system illustrated in FIG. 3. In this example, a level detector array 510 can also be referred to as a level detector converter array. In contrast to the system described above with respect to FIGS. 2 and 4 that utilized the array for monitoring received signal strength, the level detector converter array 510 employs the array to convert received optical signals to alternate communications paths or channels where data can be derived directly. An optical signal is received through a solar filter 520 and telescope 524. The optical signal is fed through one or more coupler/splitters 530, 534, and 538 at the output of the receiver optics. It is noted that if only two level detectors are employed in the array 510, then only a single couple/splitter would be utilized. Output from the coupler/splitters 530 though 538 passes through the level detector converter array 510 and processed by an array of A/D converters 540, 542, 544, and 546, and a controller 550.

In this example, the level detector converter array 510 includes four level detectors 560, 562, 564, and 566. As noted previously, the array 510 should include at least two level detectors. In one example, each level detector 560 through 566 can employ a photodector followed an amplifier (e.g., regular amplifier or integrating amplifier (IA)). Each photodector can include similar integration times (e.g., 1 microsecond). Similarly, each amplifier following the photodetectors can be set with similar integration constants. In an alternative example, each photodector can be selected for a differing integration time to improve sensitivity of the array. For example, the photodector of level detector 560 can have a 10 millisecond integration time, the photodector of level detector 562 can have 100 microsecond integration time, the photodector of level detector 564 can have 1 microsecond integration time, and the level detector 566 can have a 0.01 integration time for example. Thus, in this example configuration, the longest integration time can be employed for weaker signals and the longer integrations times for stronger signals. Similarly, the integration constant of the IA's in each level detector 560 though 566 can be altered to further increase sensitivity (e.g., feedback capacitor of integrator selected differently for each level detector).

The controller 550 analyzes each signal received from each A/D 540-546 to determine a suitable communications path. For example, the controller 550 can receive a separate packet for each level detector in the array from each A/D 540-546. Based on the detected quality of the received signal and for each level detector, the controller selects a communications path through the array 510 that provides suitable communications. For example, if one level detector is in saturation, the received signal bit error rate (BER) would be above a predetermined threshold and the controller 550 would reject that path or channel. Similarly, if another level detector in the array 510 were below a cutoff threshold, then the BER would also be above the predetermined threshold and the controller 550 would similarly reject that path or channel while then selecting a more suitable path.

If communications are received though a path of the array 510 that provides a suitable communications channel, then the level detector in the array will be selected for ongoing communications as long as conditions are favorable for such communications. If conditions change due to fading and/or high signal strength conditions, then an alternative channel can be selected by the controller 550 as conditions change. As shown, a range detector 570 can also be employed as described previously. After data has been converted by the controller 550 to a digital packet over the selected communications channel from the level detector converter array 510 and A/D's 540-546, communications data at the receiver can be decoded and/or further processed via the selected channel.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
    a detector array having a plurality of level detectors to monitor an optical input signal, wherein each level detector of the detector array operates in a different operating range, each operating range for each level detector having a different saturation level and a different cutoff level based on a power level of the optical input signal;
    a first level detector of the plurality of level detectors having a first operating range and operating at cutoff in response to the optical input signal;
    a second level detector of the plurality of level detectors having a second operating range and operating at saturation in response to the optical input signal;

a third level detector of the plurality of level detectors operating at a third level between the first level and the second level, the third level being associated with a present power level of the optical input signal; and a controller to monitor each level detector of the plurality of level detectors to detect the present power level for the optical input signal, and to dynamically adjust the sensitivity level of a receiver photodetector in response to the detected present power level.

2. The system of claim 1, further comprising at least one coupler or at least one splitter to provide at least two optical tap points of differing power levels to the plurality of level detectors.

3. The system of claim 2, wherein the at least one coupler is a single mode or multimode fiber and the at least one splitter is a mirror or prism configuration.

4. The system of claim 2, further comprising a variable optical attenuator to generate a variable attenuated output to the receiving photodetector in response to the controller.

5. The system of claim 2, wherein each of the level detectors in the plurality of level detectors include a photodiode and an integrating amplifier (IA) to convert the optical input signal to an electrical signal.

6. The system of claim 5, wherein each photodiode in each level detector is set to a different integration time to increase sensitivity of the detector array.

7. The system of claim 5, wherein each IA in each level detector is set to a different integration constant to increase sensitivity of the detector array.

8. The system of claim 2, further comprising a logarithmic amplifier and a limiting amplifier that is selected by the controller to process received optical signals based on signal conditions.

9. The system of claim 2, further comprising at least one analog to digital (A/D) converter to convert at least one output signal from each level detector of the detector array to a digital packet associated with each level detector, wherein the controller processes the digital packet associated with each level detector from the A/D and selects the operating range for each level detector based on the digital packet associated with each level detector.

10. The system of claim 1, further comprising a range detector to provide distance data representing a distance between a source of the optical input signal and the system to the controller, wherein the controller performs automated calibration to adjust one or more intensity levels of the level detectors in response to the distance data.

11. The system of claim 10, wherein the distance data is provided by a direct measurement via a RADAR system, provided by a round-trip transit time measurement via an ancillary communication system or a laser system, or provided by a data input received from a communications channel or a global positioning system (GPS).

12. A system comprising:

a converter array having a plurality of level detectors to receive an optical input signal and to generate at least one output signal from each level detector, wherein each level detector of the converter array operates in a different operating range, each operating range for each level detector having a different saturation level and a different cutoff level based on a power level of the optical input signal;

an analog to digital converter (A/D) array to convert the at least one output signal from each level detector of the converter array to a digital packet associated with each level detector; and a controller to process the digital packet associated with each level detector from the A/D array and to dynamically adjust the operating range for the converter array based on data from the digital packet associated with each level detector, wherein the data represents a respective power level of the optical input signal associated with each respective level detector that is operating between the saturation level and the cutoff level.

13. The system of claim 12, wherein each of the plurality of level detectors of the converter array include a photodiode and an integrating amplifier (IA) to convert the optical input signal to an electrical signal.

14. The system of claim 13, wherein each photodiode in each level detector is set to a different integration time to increase sensitivity of the converter array.

15. The system of claim 13, wherein each IA in each level detector is set to a different integration constant to increase sensitivity of the converter array.

16. The system of claim 1, wherein a portion of the optical input signal is directed to the receiver photodetector and another portion of the optical input signal is diverted to a plurality of optical splitters, each optical splitter of the plurality of optical splitters to divide the another portion of the optical input signal into different portions of the another optical input signal power for a respective level detector in the level detector array.

* * * * *